Figure 1:
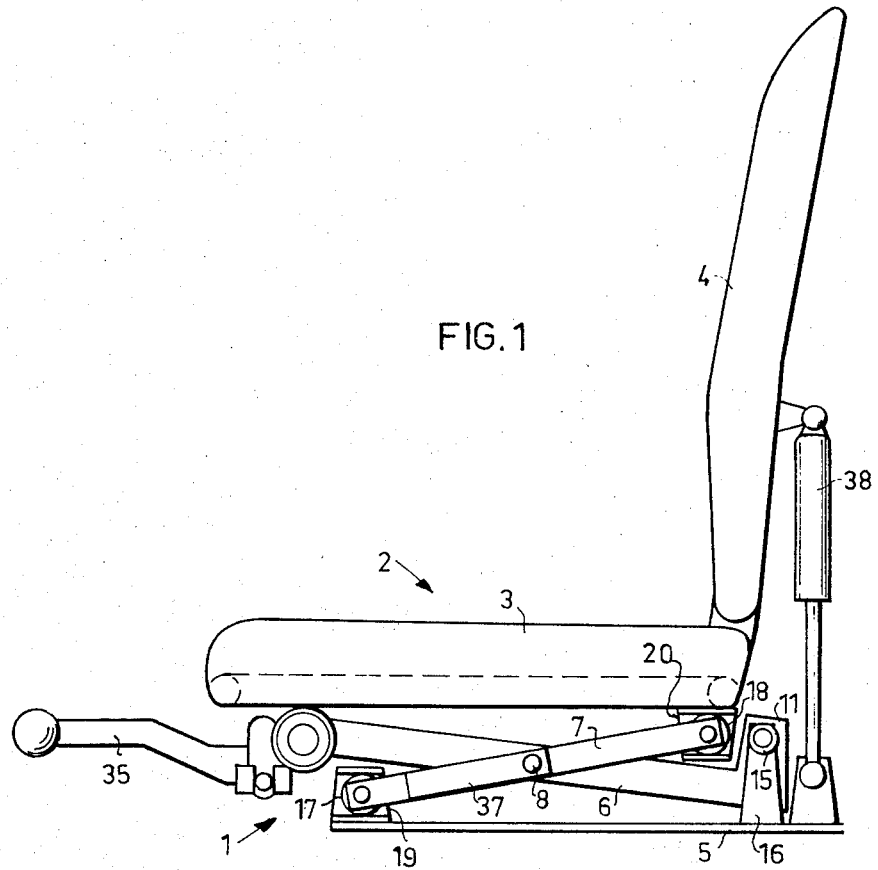

United States Patent [19]

Forssell

[11] 3,853,296

[45] Dec. 10, 1974

[54] VEHICLE SEAT WITH SUSPENSION DEVICE

[75] Inventor: Carl Fredrik Johan Sigvard Forssell, Goteborg, Sweden

[73] Assignee: AB Volvo, Goteborg, Sweden

[22] Filed: Mar. 2, 1973

[21] Appl. No.: 337,364

[30] Foreign Application Priority Data
Mar. 3, 1972 Sweden............................... 2741/72

[52] U.S. Cl.................................. 248/399, 248/421
[51] Int. Cl. .......................................... F16m 13/00
[58] Field of Search..................... 248/399, 400, 421

[56] References Cited
UNITED STATES PATENTS

| | | | |
|---|---|---|---|
| 2,652,880 | 9/1953 | Gundersen........................ | 248/421 X |
| 2,682,295 | 6/1954 | Hickman......................... | 248/399 UX |
| 3,301,520 | 1/1967 | Barth et al........................ | 248/399 |
| 3,423,060 | 1/1969 | Fulling.............................. | 248/399 |

FOREIGN PATENTS OR APPLICATIONS

| | | | |
|---|---|---|---|
| 1,372,202 | 8/1964 | France................................ | 248/399 |
| 863,303 | 1/1953 | Germany............................ | 248/399 |

*Primary Examiner*—William H. Schultz
*Attorney, Agent, or Firm*—Young & Thompson

[57] ABSTRACT

A vehicle seat suspension device includes one pair of links, arranged on opposite sides of a vehicle seat bottom, the separate links of each pair intersecting each other and being joined together at their point of intersection. One link in each pair of links is firmly connected to the corresponding link of the opposite pair and is pivotally joined at its ends to the seat bottom and to a supporting portion. The other link arm is pivotally joined to any one of its three points of attachment and is both pivotally and displaceably arranged at the other two points of attachment. The rear end of the former pivotally connected link has a portion which is angled upwardly and the rear pivot point of the link lies within this portion so that the front and rear pivot points are roughly on the same level in the normal height position of the seat.

2 Claims, 2 Drawing Figures

VEHICLE SEAT WITH SUSPENSION DEVICE

The following invention relates to a vehicle seat with a suspension device, including two pairs of link arms, pivotally joined to each other at the intersection points, of which at least the one link arm in the one pair is rigidly joined with the corresponding link arm in the other pair, the pairs of link arms being arranged on opposite sides of the actual seat portion of the seat, hereinafter called the seat bottom and the ends thereof being joined with respectively the seat bottom and a supporting portion, e.g., a vehicle floor. The seat bottom is movable towards and away from the supporting portion in a direction substantially at right angles to the supporting portion, a first link arm in each pair of link arms being pivotally joined at the ends thereof to the seat bottom and to the supporting portion respectively, while the other or second link arm in each pair of link arms is pivotally joined to one of its three places of attachment at the intersection point, the seat or the supporting portion, and both pivotally and displaceably arranged at the two other places of attachment. Torsional spring means are arranged between the first arm and the seat bottom, to counteract movement of the seat bottom towards the supporting portion.

It is known, especially in trucks and different kinds of tractors and motorized equipment, to improve passenger comfort by providing different suspension arrangements for springing and damping movements of the seat in the vertical direction. Two basic designs are prevalent for controlling vertical seat movement, namely one in which a number of links are pivotally joined to each other to form a movable parallelogram and a second in which links are arranged to cross each other to form a scissor-like construction of the kind mentioned above.

With a suspension device of the type which includes a movable parallelogram of links there is the disadvantage that the vertical sides of the parallelogram require a large amount of space, which gives the whole design an unfavourable least height. This has especially great significance with certain trucks, where the driver is placed as low as possible and right above a front wheel.

The disadvantage with the described suspension device is removed by using a scissor-like device of the kind mentioned above, with which latter device the rear ends of the two link arms are pivotally joined to the seat and to a supporting portion respectively, and the forward ends are rotatably and displaceably joined to the seat and the supporting portion respectively. A construction is thus obtained which requires very small space in regard to height. However, the forces occurring when the vehicle to which the device is fitted is braked sharply or involved in a collision act unfavourably on the device. These forces are mainly taken up by the rear half of the link arm pivotally joined to the seat, the pivot between the link arms and the rear half of the link arm pivotally joined to the supporting portion. This leads to serious buckling stresses on the first-mentioned link arm, which must therefore be heavily dimensioned.

Another proposed scissor-like design of the kind mentioned above has a straight pair of link arms which join the seat bottom to the supporting portion. As a result of the slope given to the link arms in this particular design, however, there is a large difference in the level of the pivots at the ends of the link arms, which causes the springing movement of the seat also to contain an unfavourable horizontal component.

The object of the present invention is to eliminate the disadvantages of the suspension devices described above, and to provide a seat with a suspension device which takes up little space vertically, enables large forces to be taken up in a horizontal direction without risk of breaking due to buckling stresses and which does not move appreciably in a horizontal direction during spring movement. This is attained according to the invention by a vehicle seat with a suspension device of the kind mentioned above, with which device the first mentioned pivotally journalled link arm is longer than the other link arm and is so arranged that both its ends lie outside the ends of the other link arm when seen sideways of the seat.

Figure 2:
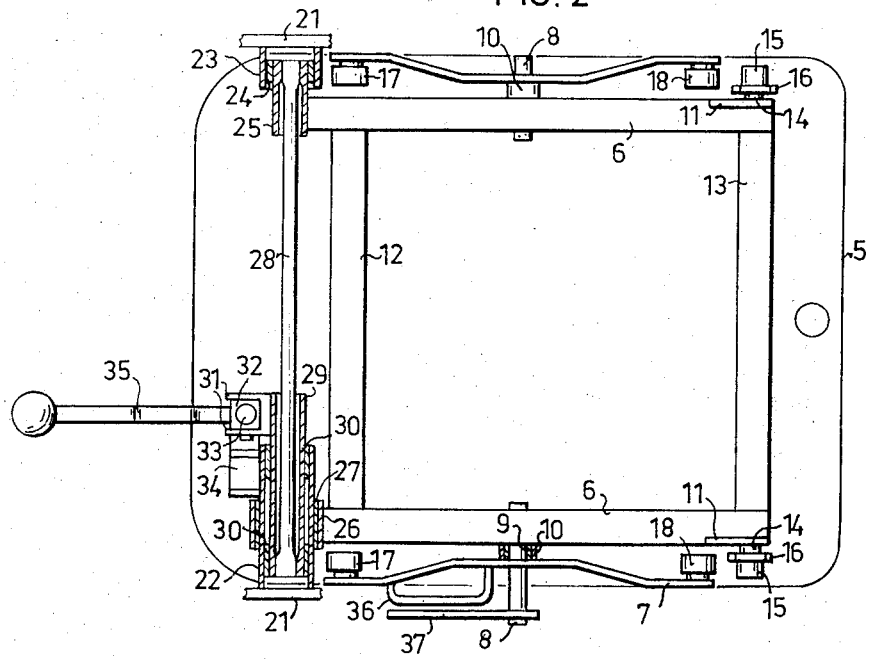

Further distinguishing features of the invention will be apparent from the following description which is given with reference to an embodiment shown on the accompanying drawing, where FIG. 1 shows a seat with a suspension device according to the invention seen from the side, and FIG. 2 shows an elevation from above of the suspension device itself.

The sprung suspension device, generally designated by the reference numeral 1, is shown in FIG. 1 carrying a seat 2, which includes a seat bottom 3 and a back support 4 on a supporting portion in the form of a baseplate 5. The seat 2 can be of any suitable known design, and the baseplate 5 is suitably longitudinally displaceably arranged in longitudinal guides in a known manner which is not shown in detail. While driving, the baseplate 5 is to be considered as fixedly united with the vehicle.

The suspension device 1 includes two pairs of link arms, comprising a first arm 6 and a second arm 7, which cross each other at their respective middle points, and are there pivotally joined to each other by a pin 8 which is fixedly arranged on first link arm 6 and which rotatably carries through a plain bearing 9 a sleeve 10 rigidly joined to second link arm. The link arms 6 have at their rear ends an upwardly angled portion 11, and are further, as can be seen from FIG. 2, rigidly joined together by transverse frame members 12 and 13, so that the link arms 6 together with the frame members 12 and 13 form a closed frame structure with great stiffness against twisting and deformation in all directions.

The upwardly angled portions 11 of the link arms 6 have journal pins 14 which run in bearings 15 carried in upwardly angled flanges 16 firmly united with the baseplate 5, so that the link arms 6 are pivoted relative to the baseplate 5 about their rear ends. At their forward ends the link arms 6 are pivotally joined with the base of the seat bottom 3 coaxially with a spring device in the form af a torsion bar, which will be further described later. The second link arms 7 in each pair carry rotatably journalled rollers 17 and 18 at each end. The foremost roller 17 runs in a horizontal guide 19 having a U-shaped cross-section and being firmly united with the baseplate 5, while the rear roller 18 runs in a corresponding guide 20 firmly united with the base of the seat bottom 3. As can be seen from the Figures, link arms 6 are longer than link arms 7, so that the ends of the latter will lie inside the connecting points of the former, seen sideways of the seat, and furthermore the upwardly angled portions 11 of the link arms 6 are situated behind the seat bottom 3. Hereby the seat bottom can move downwards until the link arms 6 and 7 lie nearly horizontal, by which is obtained a large path of vertical movement. Due to the arrangement described, all horizontal forces in a longitudinal direction will be transferred via the link arms 6 from the seat to the baseplate 5. The only task of the link arms 7 is to keep the seat bottom 3 in a position parallel with the baseplate 5, irrespective of the angle between the link arms 7 and the baseplate. On the other hand, the link arms 7 do not contribute to increasing the resistance of the seat against forces in the longitudinal and transverse direction of the vehicle, or to the resistance of the seat against swaying, this solely being the task of the link arms 6 together with the frame members 12 and 13.

Referring to FIG. 2, the pivotal connection of the link arms 6 with the seat bottom 3 is described in connection with a spring means counteracting movement of the seat bottom towards the baseplate. Two sleeves 22 and 23 are welded onto a front part of a frame portion 21 on the base of the bottom 3. One of these sleeves 22 has a somewhat larger axial extent than the other one 23. An inner sleeve 25 is journalled in the sleeve 23, via a plain bearing 24, the inner sleeve being firmly united with the front end of one link arm 6. The other link arm 6 is firmly attached at the front end thereof to a sleeve 26 which in turn is journalled outside of and adjacent to sleeve 22 via a plain bearing 27. Extending coaxially with the sleeves 22 and 23 is a torsion bar 28, one end of which engages concentrically in the sleeve 25 and is non-rotatably united therewith by splines. The other end of the torsion bar 28 engages concentrically in a tube-shaped element 29, and is non-rotatably united with it via splines. The element 29 is rotatably journalled in the sleeve 22 via two plain bearings 30, and has a pair of levers 31 arranged on a portion located axially outside the sleeve 22, the pair of levers 31 abutting a threaded nut 32. A threaded screw 33 engages in the nut 32 and abuts against a supporting bearing 34 firmly attached to the sleeve 22. A reversible locking mechanism which may be of any suitable known design and which is not shown in detail, is mounted on the lower end of the screw. The locking mechanism is operated by an operating lever 35. Through the described design the frame structure formed by both the link arms 6 and frame members 12 and 13 is pivotable relative to the seat bottom 3, and is non-rotatably fastened at the one end of the torsion bar 28, the other end of which is non-rotatably attached to the base of the seat bottom. The torsion bar is hereby so built-in that its torque strives to increase the angle between the seat bottom 3 and the link arms 6, which means that the torsion bar counteracts depression of the seat bottom when a load is applied thereon. To dampen the vertical movement of the seat, a shock absorber 38 is arranged in a conventional way between the back support 4 of the seat and the baseplate 5. By using the operating lever 35, it is possible to turn the screw 33 in a desired direction so that via the pair of levers 31 and the element 29 one end of the torsion bar 28 is turned relative to the other end to vary pre-tensioning of the bar 28. Hereby it is possible, irrespective of the load on the seat (the weight of the driver) to adjust the seat bottom to a desired level in the rest position. To indicate a normal position there is a device which works in cooperation with the one pair of link arms 6, 7. This device consists of two arms or discs 36 and 37 of which one, 36, is firmly attached to the link arm 7 and the other, 37, is non-rotatably attached to an extension of the journal pin 8 of the link arms, so that the disc 37 lies outside disc 36. The discs 36 and 37 are hereby so mounted that they cover each other when the seat is at a normal level. By feeling the discs 36, 37 with one hand at the same time as the lever 35 is operated with the other hand, a person sitting in the seat can easily ascertain when it is adjusted to the normal position.

Due to the frame structure formed by the link arms 6 and frame members 12 and 13 with four rotatable but immovable joints, a device is obtained which is extremely well suited to transferring collision forces and other forces which can affect the seat in different directions. By connecting the link arms 6 with the seat bottom 3 at their front ends and with the baseplate 5 at their rear ends, compression forces in the link arms 6, arising on possible collision are avoided, which is of great importance especially with the large stresses occurring if the person sitting in the seat uses a safety-belt fastened to it. Hereby deformation of the link arms 6 due to buckling is avoided. Further, upward or downward movement due to forward-pulling stresses is avoided. Due to the rear journalling points 14, 15 of the link arms 6 being raised in relation to the base 5, and lying at the same level as the forward journalling points 23, 25 and 22, 26 in the normal position, a springing movement about an arc, nearly approaching a vertical line, is obtained about a vertical position. Due to the link arms 7 being provided with a swivelling and movable joint at each end they are freed from every other load than a vertical one at the respective joints. The rolling movement at the movable joints will be the shortest possible with this device. Both these factors contribute to reduce wear and resistance to friction on springing.

What I claim is:

1. In a vehicle seat with a suspension device comprising two pairs of link arms, at least one of said link arms in one of said pairs of link arms being rigidly joined to the corresponding link arm of the other pair of link arms, said two pairs of link arms being arranged on opposite sides of said seat, a portion of the vehicle supporting said seat, said seat being movable toward and away from said supporting portion in a direction substantially perpendicular to said supporting portion, each of said link arms having three places of connection, namely at said point of intersection, the bottom of said seat and said supporting portion, a first link arm of each of said pairs of link arms being joined pivotally at said three places of connection, the second link arm of each of said pairs of link arms being pivotally joined at one of said places of connection and substantially horizontally displaceable at said two other places of connection, and spring means to counteract said movement of said seat bottom in said direction towards said supporting portion; the improvement in which the points of pivotal connection of said first arm to said seat bottom and to said supporting portion are at substantially the same horizontal level, said first link arm in each of said pairs of link arms being longer than said second link arm in each of said pairs of link arms, said ends of said first link arm being situated outside said ends of said second link arm seen sideways of said seat.

2. A seat as claimed in claim 1, wherein the rear end of said first link arm has a part that is angled upward, the axis of pivotal connection of said first arm to said supporting portion passing through said upward angled part.

* * * * *